United States Patent
Mirone

(10) Patent No.: US 6,457,379 B1
(45) Date of Patent: Oct. 1, 2002

(54) HORN ACTUATING DEVICE FOR A MOTOR-VEHICLE STEERING-WHEEL

(75) Inventor: Paolo Mirone, Villastellone (IT)

(73) Assignee: Gallino Plasturgia S.r.l., Turin (IT)

( * ) Notice: Subject to any disclaimer, the term of this patent is extended or adjusted under 35 U.S.C. 154(b) by 26 days.

(21) Appl. No.: 09/667,302

(22) Filed: Sep. 25, 2000

(30) Foreign Application Priority Data

Sep. 24, 1999 (IT) ......................................... TO99A0821

(51) Int. Cl.⁷ .............................. G05G 1/10; H01H 9/00
(52) U.S. Cl. ...................... 74/552; 280/728.2; 280/731; 200/61.54
(58) Field of Search ......................... 74/552; 280/728.2, 280/731, 728.3; 200/61.55, 61.54; 411/5, 42

(56) References Cited

U.S. PATENT DOCUMENTS

| | | | | |
|---|---|---|---|---|
| 5,219,415 A | * | 6/1993 | Weinstein | 200/61.54 |
| 5,303,952 A | * | 4/1994 | Shermetaro et al. | 280/731 |
| 5,331,124 A | * | 7/1994 | Danielson | 200/61.54 |
| 5,636,858 A | * | 6/1997 | Niederman et al. | 280/728.2 |
| 5,931,492 A | * | 8/1999 | Mueller et al. | 280/728.2 |
| 6,082,758 A | * | 7/2000 | Schenck | 280/728.2 |
| 6,092,832 A | * | 7/2000 | Worrell et al. | 280/728.2 |
| 6,196,573 B1 | * | 3/2001 | Worrell et al. | 280/728.2 |
| 6,276,711 B1 | * | 8/2001 | Kurz et al. | 280/728.2 |
| 2001/0035631 A1 | * | 11/2001 | Hasebe | 280/728.2 |

FOREIGN PATENT DOCUMENTS

JP  9-2286  * 1/1997 .................. 74/552

* cited by examiner

Primary Examiner—Vinh T. Luong
(74) Attorney, Agent, or Firm—Sughrue Mion, PLLC

(57) ABSTRACT

A horn actuating device for a motor-vehicle steering-wheel comprises a plurality of spring which resiliently support an actuating element constituted by the housing of the air-bag associated with the steering-wheel or a covering element for the steering-wheel hub. The springs define movable electric contacts adapted for co-operation with fixed electric contacts for actuation of the horn. All these contacts are connected to electric conductive strips embedded in a flexible strip of plastic material which is connected to supports also made of plastic material, on which the above mentioned springs rest. The actuating element is provided with studs guided within bushes forming part of said supports of plastic material. The studs are held at the lower end by elastically deformable stop means which enable a rapid installation of the air-bag unit or the hub covering element on the steering-wheel frame.

7 Claims, 6 Drawing Sheets

HORN ACTUATING DEVICE FOR A MOTOR-VEHICLE STEERING-WHEEL

BACKGROUND OF THE INVENTION

The present invention relates to horn actuating devices for motor-vehicle steering-wheels, particularly steering-wheels provided with an air-bag.

The applicant has already proposed in Italian patent application no. TO98A000795 filed on Sep. 17/1998 (still secret at the priority date of the present application) a motor-vehicle steering-wheel comprising:

- a metal frame, including a hub, a rim and a plurality of spokes connecting the hub to the rim, an actuating element which is mounted above the frame of the steering-wheel so as to be movable between
- a raised rest position and a lowered position for horn actuation,
- Spring means interposed between said actuating element and said steering-wheel frame for biasing the actuating element towards its raised position,
- a horn actuating device, interposed between the actuating element and the hub and comprising at least a first electric contact rigidly connected to the frame of the steering-wheel and at least a second electric contact movable with the actuating element and adapted for co-operating with said first electric contact for actuating the horn,
- wherein said spring means are constituted by a plurality of springs, each having a base portion fixedly supported on the steering-wheel frame, and a flexible portion operatively associated with the actuating element and having free end bent towards the steering-wheel frame and adapted to form said second electric contact co-operating with said first electric contact,
- wherein said springs are mounted on respective supports of plastic material which are connected to each other by a flexible strip of plastic material, in which there are embedded two conductive strips which are electrically connected to each spring and said first electric contact co-operating therewith, so as to form a pre-assembled unit accommodated on the steering-wheel frame,
- and wherein said supports of plastic material of the springs include guide bushes wherein studs are slidable which are rigidly connected to the actuating element so as to be movable therewith, stop means being interposed between the lower end of each stud and the steering-wheel frame to limit the upward travel of the actuating element with respect to the steering-wheel frame.

The actuating element of the device can be constituted by the lower rigid wall of a housing for an air-bag associated with the steering-wheel, or it can be constituted simply by a steering-wheel hub covering element which hides the hub of the steering-wheel from view.

SUMMARY OF THE INVENTION

The object of the present invention is that of further simplifying the structure of the previously proposed steering-wheel so that the horn actuating device can be mounted on this steering-wheel with particularly easy and rapid operations. In view of achieving this object, the invention provides a steering-wheel having all the above indicated features wherein said stop means provided at the lower end of each stud projecting from the actuating element are elastically deformable, so as to enable rapid installation of said studs of the actuating element within said guide bushes forming part of said pre-assembled unit.

BRIEF DESCRIPTION OF THE DRAWINGS

Further features and advantages of the invention will become apparent from the description which follows with reference to the annexed drawings, given purely by way of non-limiting example, in which.

DETAILED DESCRIPTION OF THE INVENTION

Figure 1:
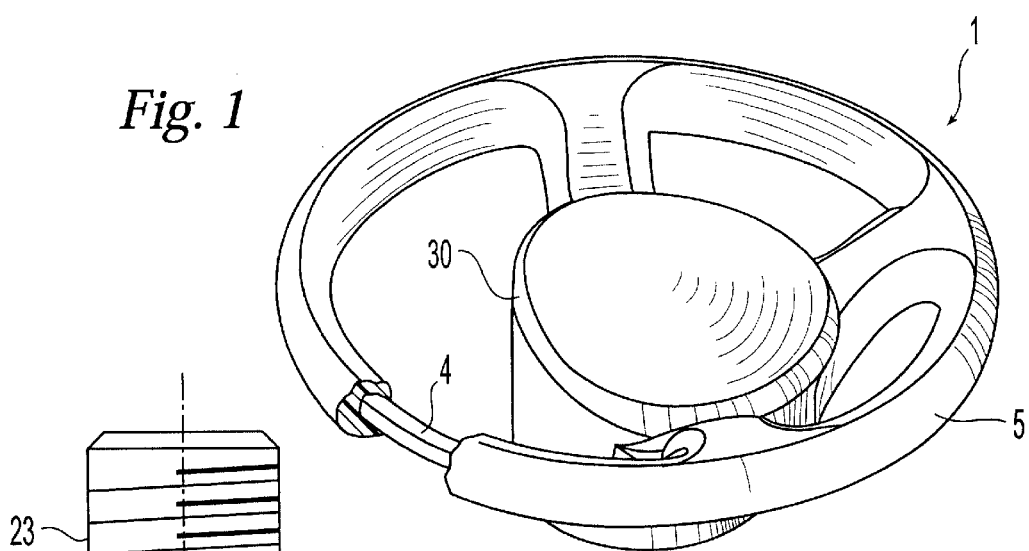
FIG. 1 is a diagrammatic view of a steering wheel according to the previous proposal.
Figure 2:
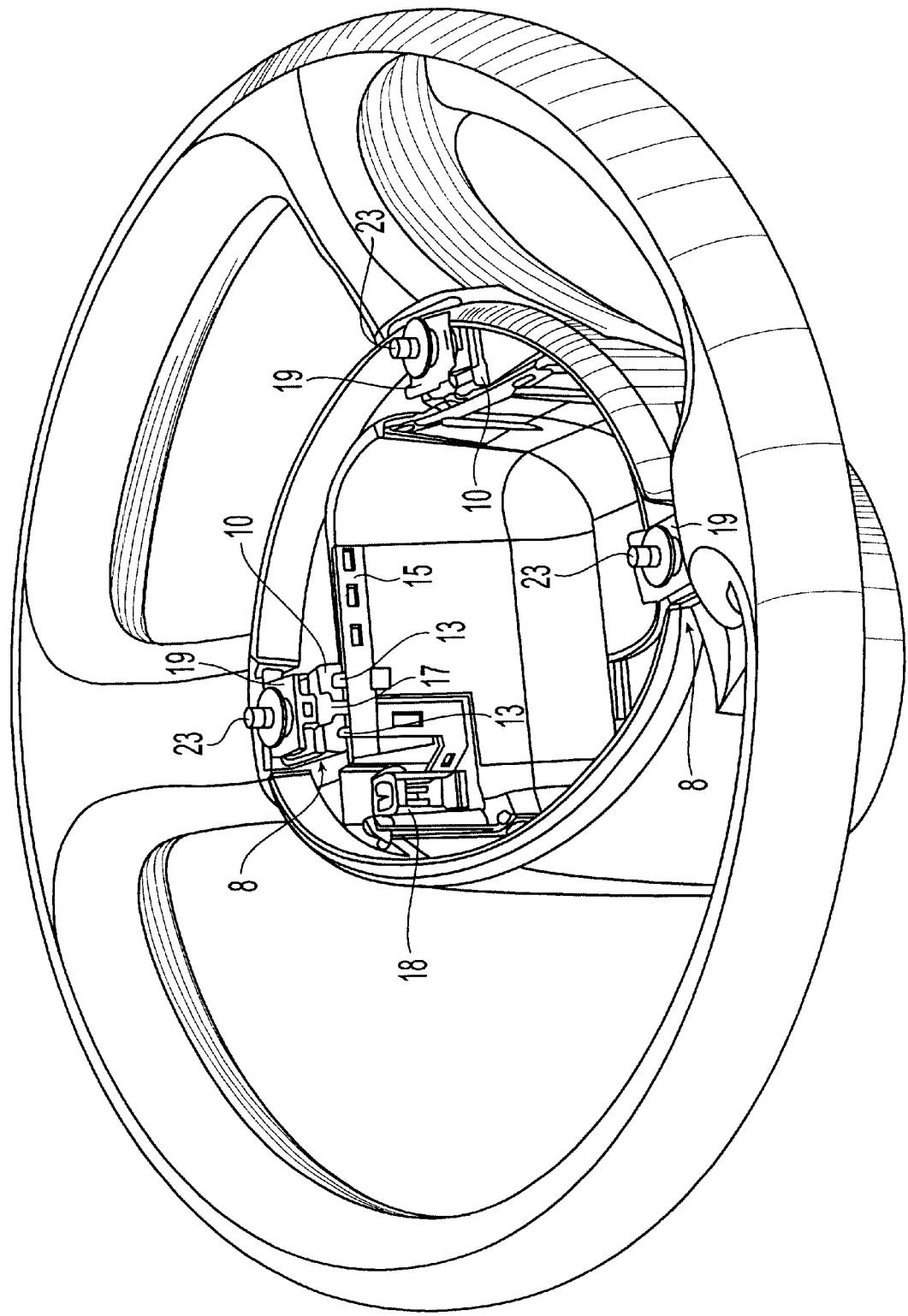
FIG. 2 is a perspective view of the steering wheel of FIG. 1, with the air-bag housing removed.
Figure 3:
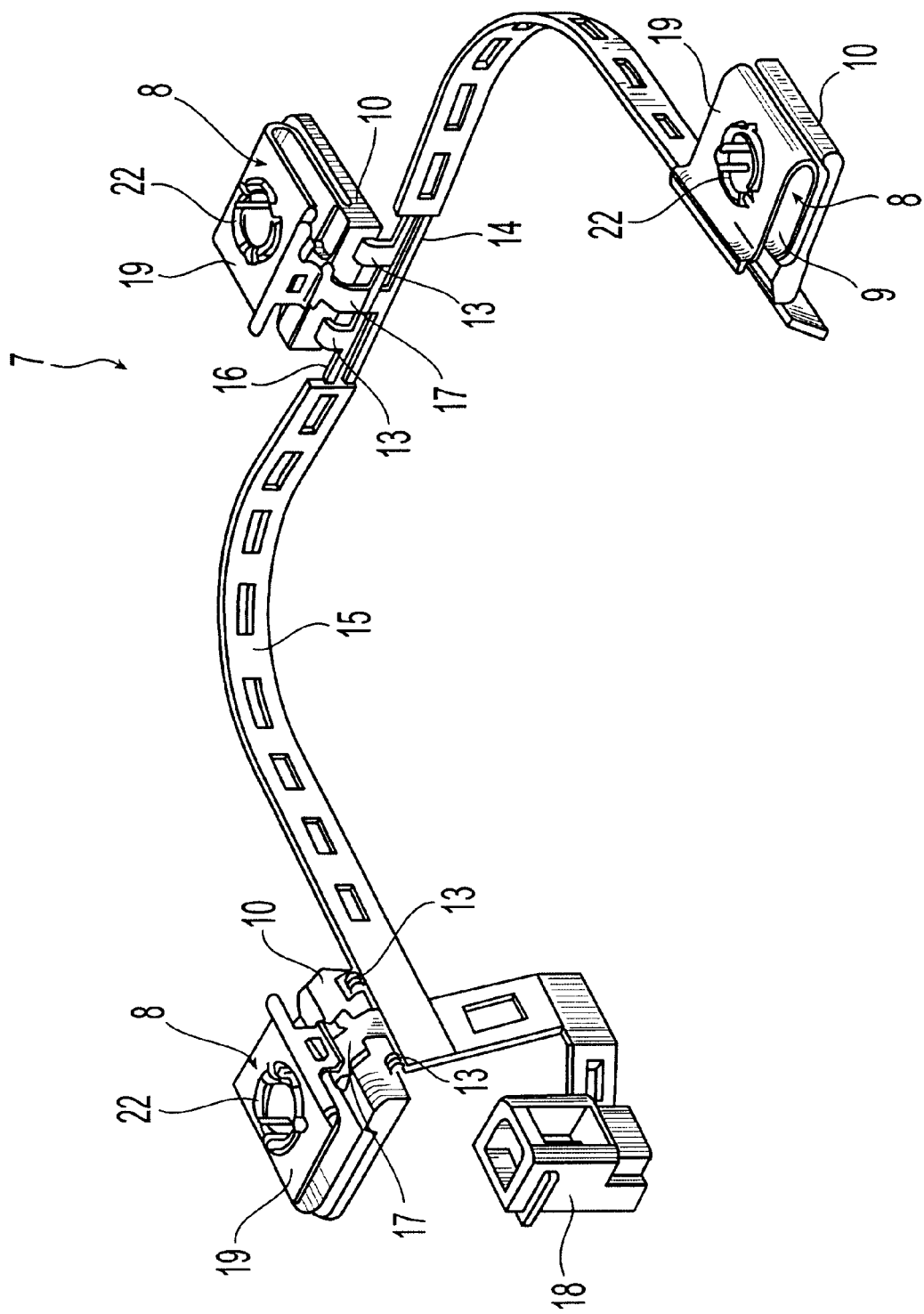
FIG. 3 is a perspective view of the horn control unit which is provided within the steering-wheel.

With reference to FIGS. 1–3, numeral 1 generally designates the motor-vehicle steering wheel forming the subject of the previous Italian patent application of the same applicant which has been identified above. The steering-wheel 1 comprises a metal frame 2 including a plurality of spokes 3 connecting a rim to a hub 30 which is to be connected to the steering-shaft of the motor-vehicle . Each spoke 3 is embedded within a body 5 of plastic material and has an intermediate portion 6 providing a support for the horn actuating device associated with the steering-wheel 1. This device is generally designated by reference numeral 7 and comprises three metal springs 8 each formed by a metal strip bent substantially in a U-shape and arranged horizontally, with its cavity facing towards the steering-wheel axis. Each spring 8 has a base portion 9 which rests above a flattened support 10 of plastic material. More precisely, the base portion 9 of each spring 8 rests on, and is in electric contact with, projections 11 of a conductive metal leaf 12 which is embedded within the body of plastic material of support 10. The conductive leaf 12 extends into two flattened appendages 13 (FIG. 3) which project outwardly from the plastic body of support 10 and are in electric contact with an electrically conductive strip 14 which is embedded within the body of a flexible strip 15 of plastic material connecting the three supports 10 to each other. Within the flexible strip 15 of plastic material there is also embedded a second electrically conductive strip 16 electrically connected to a terminal 17 projecting outwardly from strip 15 at the location of each spring 8 and having its free end fitted at 17a (FIGS. 7, 8, 10) to the respective support 10. The flexible strip 15 of plastic material is also rigidly connected to, and preferably is moulded in one piece with the body of plastic material of a connector 18, which is for co-operation with a mating connector for connecting the two electric strips 14, 16 to the electric circuit of the motor-vehicle. In the illustrated example, the connector 18 is a female connector which is for co-operation with a male connector.

Figure 7:
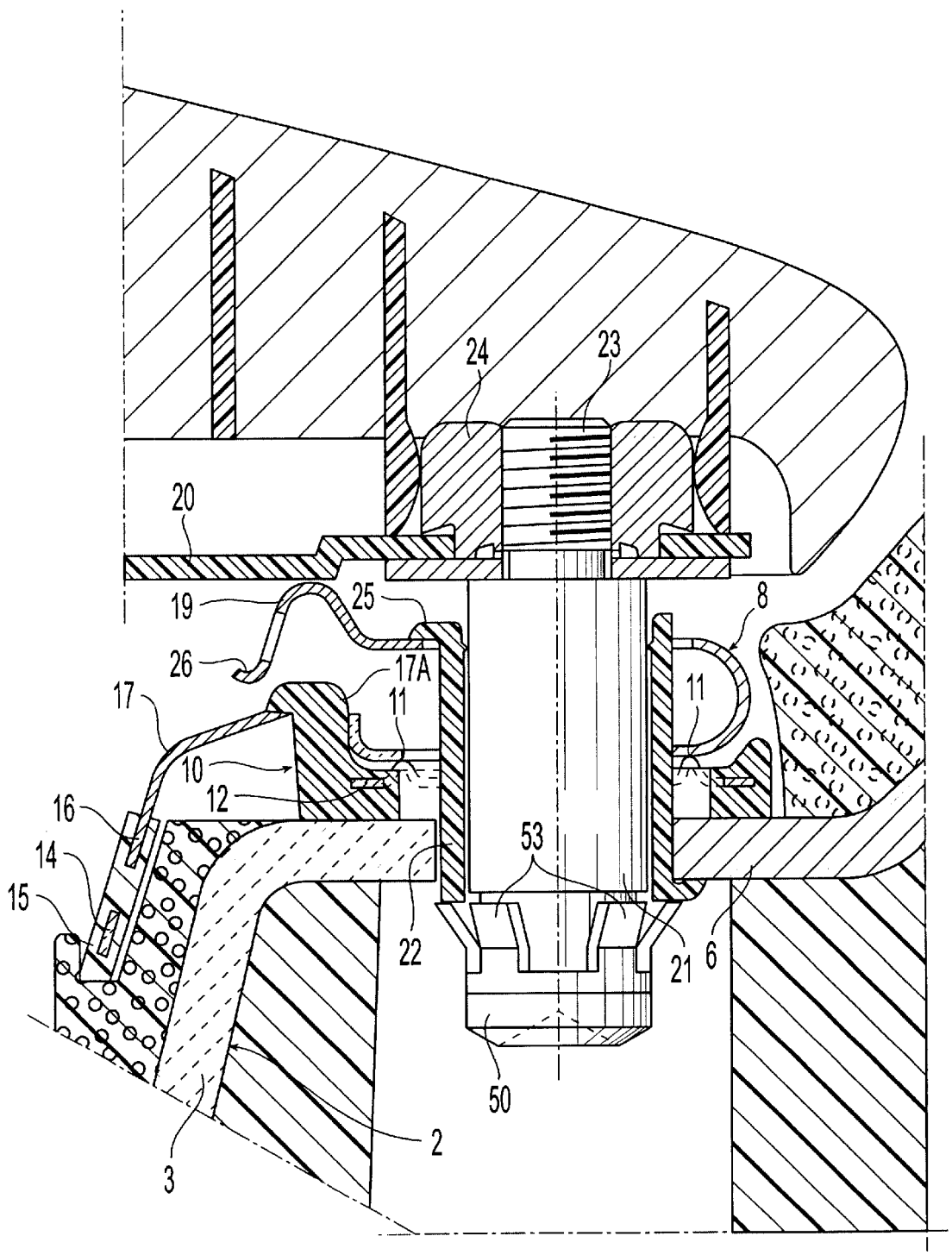
Figure 8:
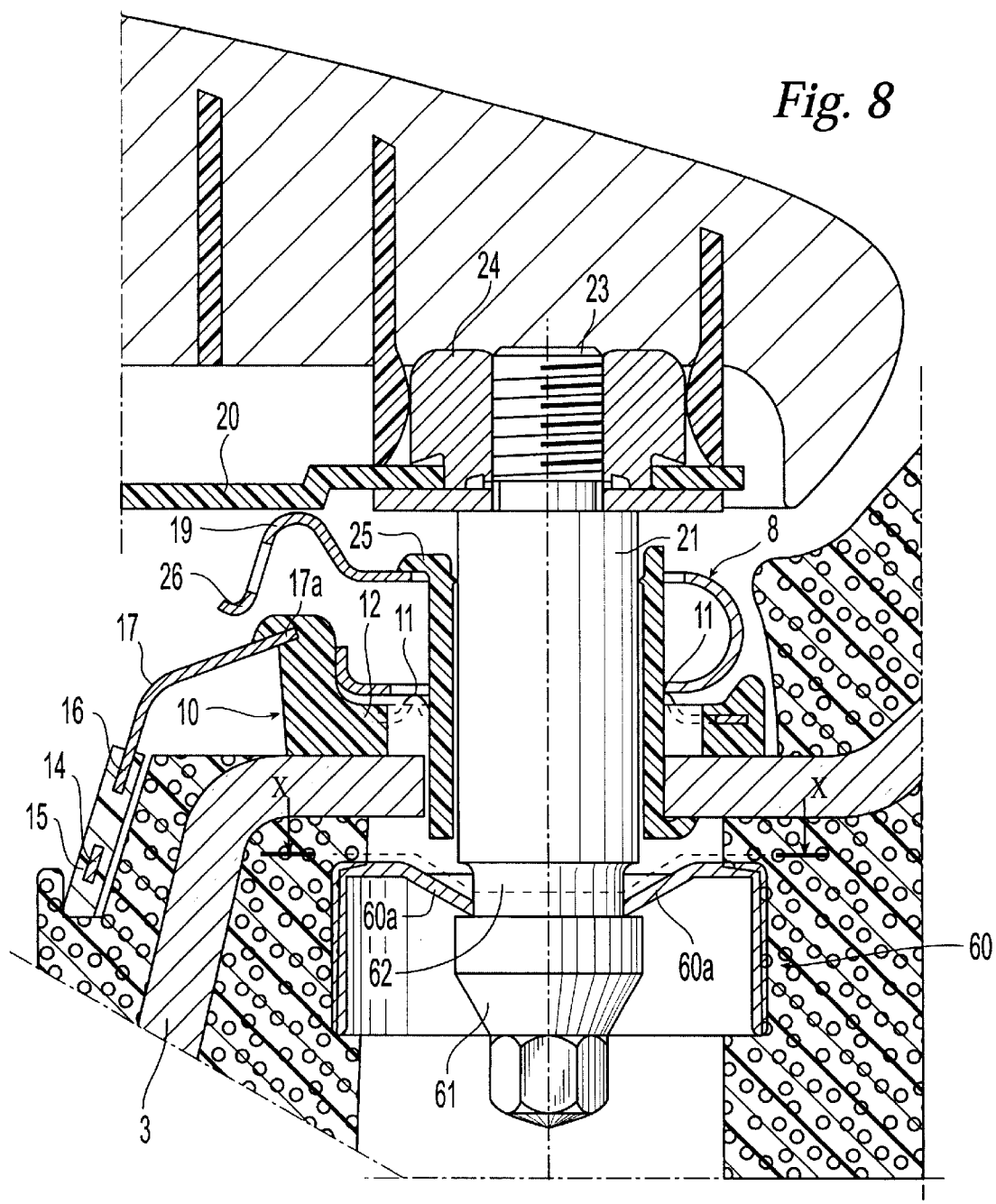
FIGS. 8, 9, and 10 show two further variants.
Figure 10:
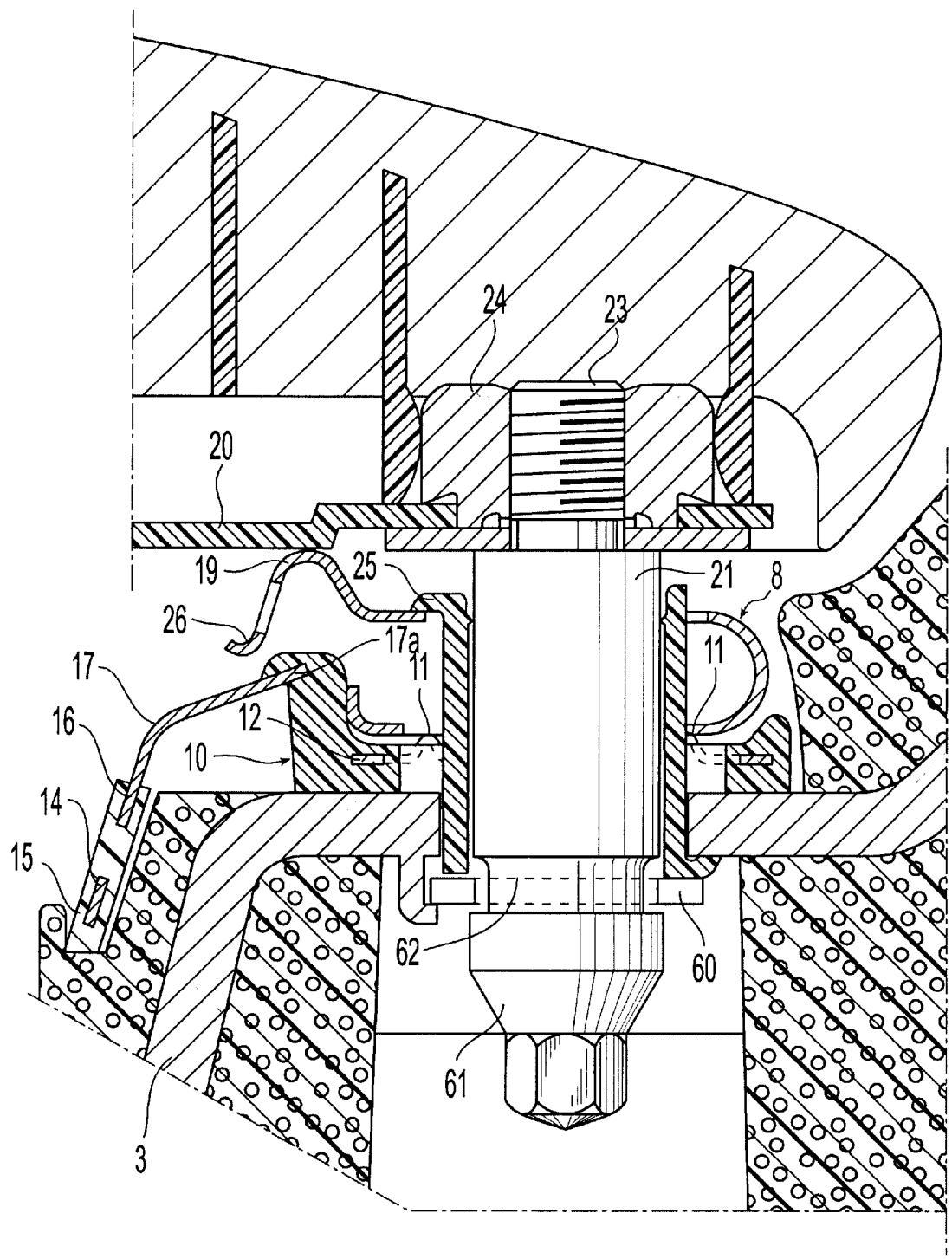

Each spring 8 has a flexible portion 19 which is pressed elastically against the lower surface of a wall 20 forming the bottom wall of a housing of an air-bag associated with the steering-wheel 1. This housing, as well as the air-bag, are not illustrated in. the annexed drawings, since these components can be made in any known way and do not fall within the scope of the invention. The air-bag housing could also be replaced, as already indicated in the foregoing, simply by a steering-wheel hub covering element. The entire air-bag housing is resiliently supported above the spring portions 19 of the three springs 8. This movement is guided by the slidable engagement of three shafts or studs 21 (only one of which is shown in FIGS. 7, 8, 10) which are secured to the bottom wall 20 of the air-bag housing, or the hub covering element, within the respective guiding bushes 22 forming part of the supports 10 of plastic material, which are secured to the spokes 3 of the steering-wheel 3.

In the case forming the subject of the previous proposal of the applicant, shown in FIGS. 1–3, each stud 21 has a threaded portion 23 which is secured to the respective bottom wall 20 by means of a nut 24 and a lower head adapted to act as a stop element co-operating with the lower end of the respective bush 22 in order to limit the upward travel of the air-bag housing. It is this portion of the device which is modified by the present invention, as will be described hereinafter. Each bush 22 also incorporates a stop tooth 25 (FIGS. 7, 8, 10) acting as a stop element for limiting the upward movement of the spring portion 19 of each'spring 8.

The appendage 17 associated with each support 10 constitutes a first fixed electric contact adapted to co-operate with a second movable electric contact constituted by a downwardly bent end 26 of the spring portion 19 of each spring 8. After that a force is applied to the housing of the air-bag, or the hub covering element, the bottom wall 20 moves downwardly, causing a lowering of the flexible portion 19 of one or more springs 8, so that the respective movable contact 26 is caused to rest against the respective fixed contact 17, thus closing the electric circuit and causing actuation of the horn.

As already indicated in the foregoing with reference to FIGS. 1–3, in the case of the previously proposed steering-wheel, each stud 21 was provided with a head adapted to act as a stop means co-operating with lower end of the respective bush 22. Therefore, in order to mount the air-bag housing, the studs had to be inserted manually from below within bushes 22 and screwed within nuts 24 which were preliminarily secured to element 20.

Figure 6:
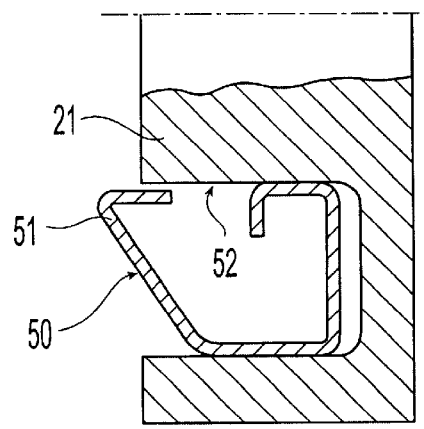
Figure 4:
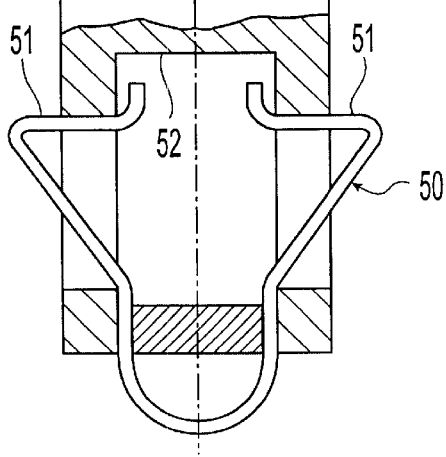
FIG. 4 shows a detail of FIG. 3 according to the present invention.
Figure 5:
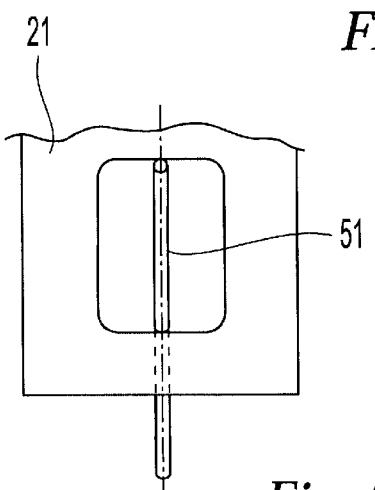
FIG. 5 is a side view of a detail of FIG. 4, FIGS. 6, 7 show two further variants.

In order to simplify installation of the air-bag unit, according to the present invention each stud 21 has elastically deformable stop means 50 in place of the head, allowing rapid installation from above of the stud 21 within the respective guide bush 22, after the stud 21 has been preliminarily secured to element 20 by nut 24. In the embodiment shown in FIGS. 4, 5, the stop means 50 are a wire spring forming a pair of radial protrusions 51 which are elastically deformable inwards. Each protrusion 51 is sloped in a way to assist its moving back into a cavity 52 of the stud 21 when it engages with the surface of the respective bush 22, during installation. FIG. 6 shows a variant with a single protrusion 51.

Figure 9:
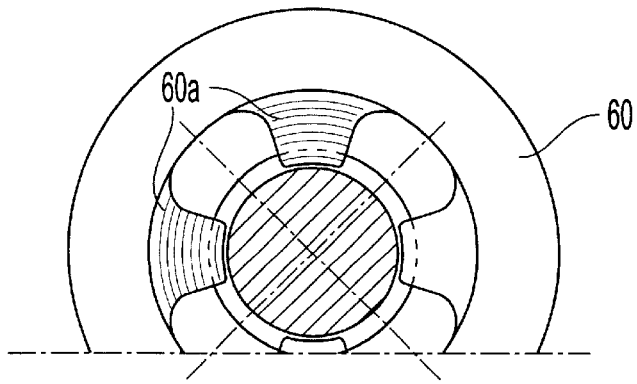

FIG. 7 shows a second embodiment where the stop means are in form of a capsule element 50 fitted on the lower end of the respective stud 21 and having a plurality of radial flaps 53 which are elastically deflectable. FIG. 8 shows a variant wherein the stud 21 is held in place by a spring element forced within the foam of the steering-wheel, this element being in form a washer 60 with internal radial flaps 60a which are deformed on installation of the stud 21 as a result of the engagement of a conical portion 61 thereof, until they enter a groove 62. FIG. 9 shows the washer 60 in plan view. FIG. 10 shows a variant with a split spring ring 60 received within a groove 62 and held by hooks of the steering-wheel frame.

As in the case of FIG. 8, the lower end of the stud has a head which can be engaged by a wrench, for removal.

Naturally, while the principle of the invention remains the same, the details of construction and the embodiments may widely vary with respect to what has been described and illustrated purely by way of example, without departing from the scope of the present invention.

In particular, it is clearly apparent that in place of the above described elastic stop means it would be possible to make use of any other form of elastic stop means adapted to enable rapid installation of the air-bag unit or the steering-wheel hub cover on the steering-wheel.

What is claimed is:

1. A motor-vehicle steering-wheel, comprising:
   a metal frame, including a hub, a rim and a plurality of spokes connecting the hub to the rim,
   an actuating element which is mounted above the frame of the steering-wheel so as to be movable between a raised rest position and a lowered position for horn actuation,
   spring means interposed between said actuating element and said steering-wheel frame for biasing the actuating element towards its raised position,
   a horn actuating device, interposed between the actuating element and the hub and comprising at least a first electric contact rigidly connected to the frame of the steering-wheel and at least a second electric contact movable with the actuating element and adapted for co-operating with said first electric contact for actuating the horn,
   wherein said spring means are constituted by a plurality of springs, each having a base portion (9) fixedly supported on the steering-wheel frame, and a flexible portion operatively associated with the actuating element and having free end bent towards the steering-wheel frame and adapted to form said second electric contact co-operating with said first electric contact,
   wherein said springs are mounted on respective supports of plastic material which are connected to each other by a flexible strip of plastic material, in which there are embedded two conductive strips which are electrically connected to each spring and said first electric contact co-operating therewith, so as to form a pre-assembled unit accommodated on the steering-wheel frame,
   and wherein said supports of plastic material of the springs include guide bushes wherein guide studs are slidable which are rigidly connected to the actuating element so as to be movable therewith, stop means being interposed between the lower end of each stud and the steering-wheel frame to limit the upward travel of the actuating element with respect to the steering-wheel frame, and
   wherein said stop means provided at the lower end of each guide stud projecting from the actuating element are elastically deformable, so as to enable rapid installation of said studs of the actuating element within said guide bushes forming part of said pre-assembled unit.

2. Steering-wheel according to claim 1, wherein said stop means are formed by a capsule element mounted on the lower end of each stud and provided with a plurality of radially projecting flaps which are elastically deflectable.

3. Steering-wheel according to claim 2, wherein said stop means are constituted by a stop spring element forced in the foam of the steering-wheel and co-operating with the respective stud.

4. Steering-wheel according to claim 3, wherein said spring element is constituted by a washer having a plurality of inner radial flaps which are elastically deformable and adapted to co-operate with a conical portion of the respective stud on installation, as well as to be received within a portion of reduced diameter of said stud when installation is completed.

5. Steering-wheel according to claim 2, wherein said stop means are constituted by a wire spring defining one or more radial protrusions which are elastically deformable inwardly.

6. Steering-wheel according to claim 1, wherein said stop means are constituted by a wire spring defining one or more radial protrusions which are elastically deformable inwardly.

7. Steering-wheel according to claim 1, wherein said spring element is a split ring adapted to co-operate with a conical portion of the respective stud on installation, and to be received on a portion of reduced diameter of said stud when installation is completed.

* * * * *